Dec. 27, 1960 T. J. RAMNICEANU 2,966,317
PADDLE WHEEL SUSTAINED AIRCRAFT
Filed Feb. 3, 1958 5 Sheets-Sheet 1

INVENTOR.
TIBERIU J. RAMNICEANU
BY
Edw. S. Higgins
ATTORNEY

Dec. 27, 1960 T. J. RAMNICEANU 2,966,317
PADDLE WHEEL SUSTAINED AIRCRAFT
Filed Feb. 3, 1958 5 Sheets-Sheet 2

INVENTOR.
TIBERIU J. RAMNICEANU
BY
Edw. S. Higgins
ATTORNEY

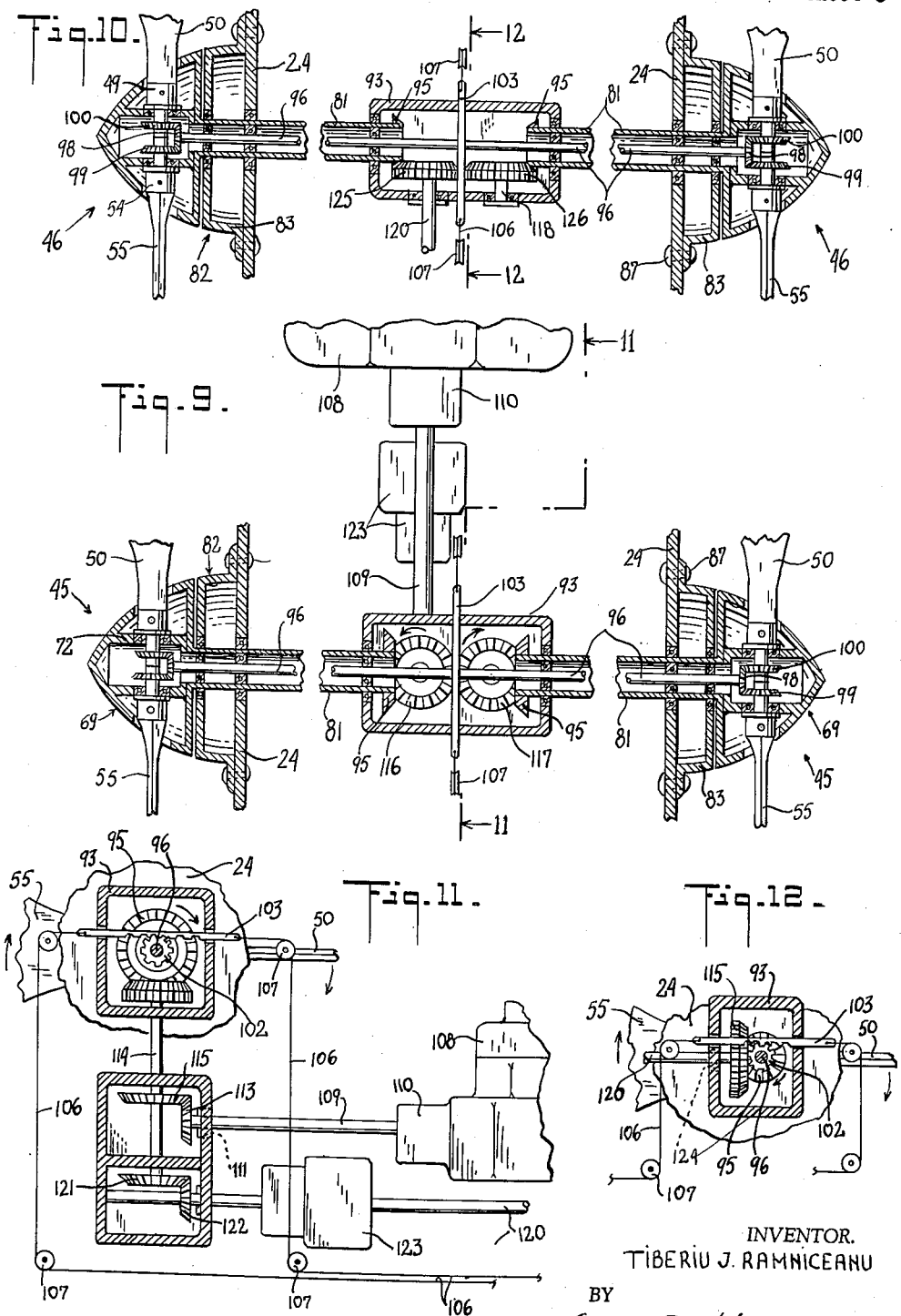

Dec. 27, 1960 T. J. RAMNICEANU 2,966,317
PADDLE WHEEL SUSTAINED AIRCRAFT
Filed Feb. 3, 1958 5 Sheets-Sheet 4

INVENTOR.
TIBERIU J. RAMNICEANU
BY
Edw. S. Higgins
ATTORNEY

Dec. 27, 1960  T. J. RAMNICEANU  2,966,317
PADDLE WHEEL SUSTAINED AIRCRAFT
Filed Feb. 3, 1958  5 Sheets-Sheet 5
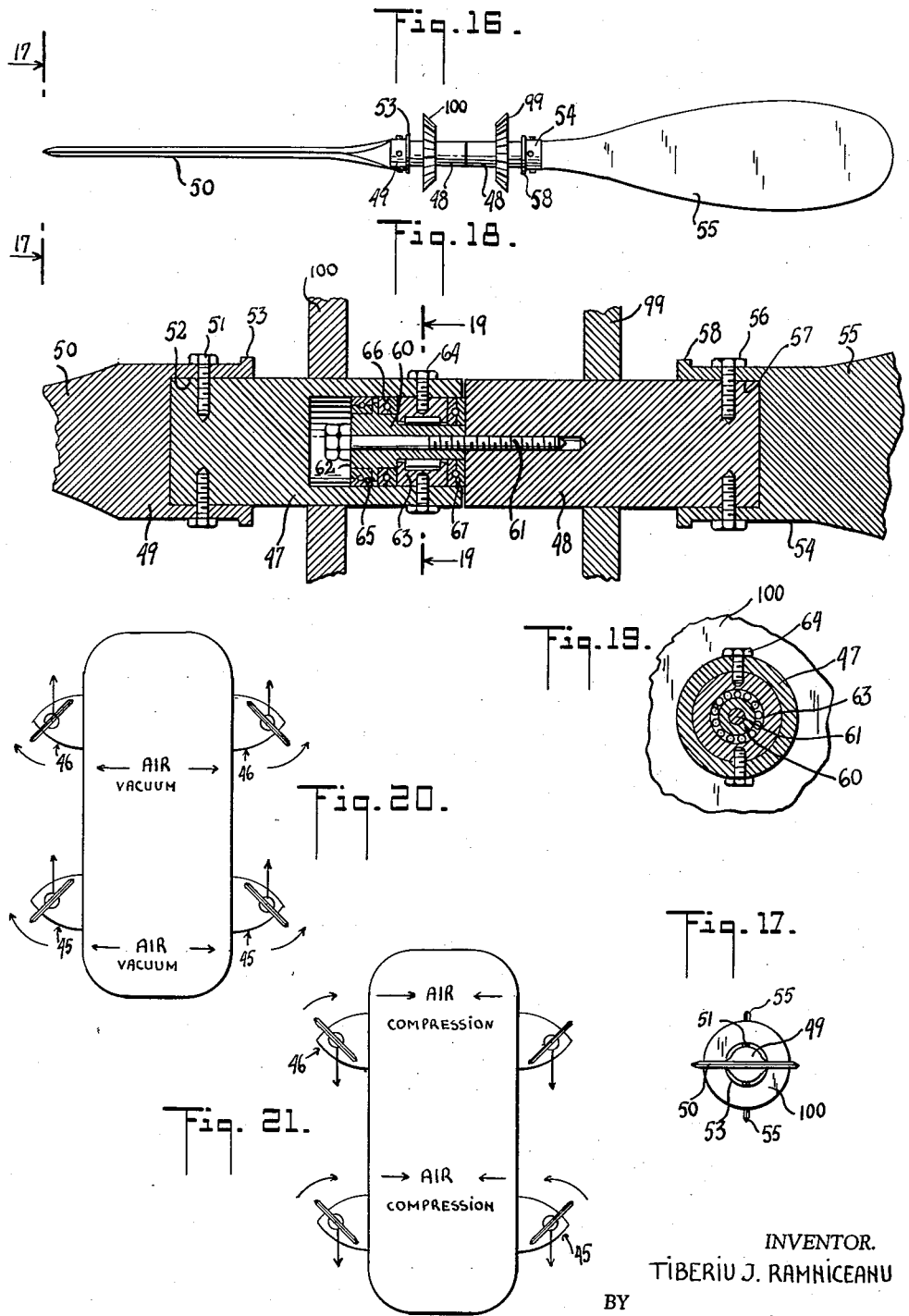
INVENTOR.
TIBERIU J. RAMNICEANU
BY
Edw. S. Higgins
ATTORNEY

United States Patent Office 2,966,317
Patented Dec. 27, 1960

2,966,317

PADDLE WHEEL SUSTAINED AIRCRAFT

Tiberiu J. Ramniceanu, Brooklyn, N.Y., assignor to Autocopter Corporation of America, a corporation of New Jersey Filed Feb. 3, 1958, Ser. No. 713,059

3 Claims. (Cl. 244—20)

This invention relates to airships and more particularly to an airship simulating an automobile.

A principal object of the present invention is to provide an airship shaped to simulate an automobile with mechanism adapted to utilize propeller assemblies at each side of the airship.

Another object of the invention is to provide an airship with propeller assemblies at the front and rear thereof with a single engine for transmitting the drive to said propeller assemblies.

A further object of the invention is to provide an airship of this type with propulsion mechanism including propeller blades disposed at the sides of the fuselage and adapted to force air downwardly and rearwardly and forwardly of the fuselage.

Still another object is to provide a propeller assembly of novel construction.

A still further object is to provide an airship in simulation of an automobile with novel type and principle of propulsion.

It is also an object of the invention to provide an airship with propeller assemblies disposed at the sides of the fuselage and protected by housings.

It is a further object to provide propulsion mechanism including propellers wherein the pitch of the blades is readily controlled.

It is also a further object to provide an airship with rotors with blade assemblies that are readily tilted bodily to control change in the direction of flight of the airship.

Yet another object is to provide an airship of this type that is efficient in operation and simple in construction.

For further comprehension of the invention and of the advantages and objects thereof reference will be had to the accompanying drawings forming a material part of this disclosure and wherein Fig. 1 is a side elevational view of an airship embodying one form of my invention, parts being shown broken away.

Fig. 9 is a horizontal sectional view through the rear of the airship, parts being shown in plan and parts being shown broken away.

Fig. 10 is a view similar to Fig. 9 taken through the front of the airship.

Fig. 11 is a sectional and elevational view taken along the line 11—11 of Fig. 9.

Fig. 12 is a vertical sectional view taken on the plane of the line 12—12 of Fig. 10.

Fig. 16 is an enlarged plan view of the propeller assembly.

Fig. 17 is an end view thereof looking from the left of Fig. 16.

Fig. 18 is an enlarged sectional view taken on the plane of the line 18—18 of Fig. 16.

Fig. 19 is a sectional view taken on the plane of the line 19—19 of Fig. 18.

Fig. 20 is a schematic view of the top of the airship showing the direction of air flow thereover.

Fig. 21 is a similar view of the bottom of the airship showing the direction of air flow thereunder.

Figure 1:
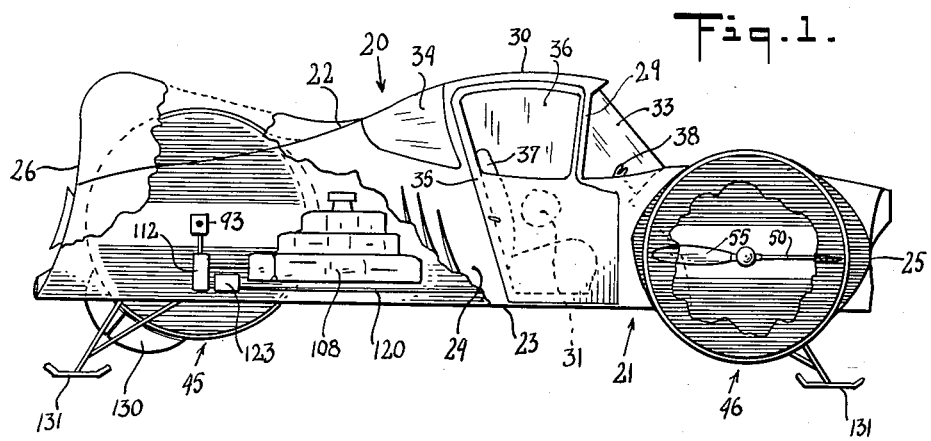

Referring in detail to the drawings, in Fig. 1 an airship embodying my invention is shown and is designated generally at 20. The airship is rectangular in shape, in side elevation and in plan, simulating the appearance of an automobile.

The fuselage or body is formed of metal or any other suitable material and has top and bottom walls 22 and 23, respectively, and side walls 24, 24, front wall 25 and rear wall 26. The side walls are formed with flanges 27 constituting propeller housings. The front wall has circular projections 28 on the top corners and on the bottom corners thereof, representing headlights. Midway the ends of the body, the top wall is formed with an inverted U-shaped vertical extension 29 forming the roof 30 of a pilot's compartment and passenger compartment 31. A slanting end curved transparent window 33 connects the front of the top of the roof with the edge of the top wall and a similar shaped transparent window 34 connects the rear of the top of the roof with the edge of the top wall. The sides of the compartment 31 are closed by hinged doors 35 having transparent windows 36. A seat 37 for the pilot extends across the compartment. A hand wheel 38 on a turnable post 39 is positioned in front of the seat for manipulating the controls.

The airship is driven by a pair of rotors 45, 45 on opposite sides of the fuselage at the rear and by a pair of rotors 46, 46 on opposite sides of the fuselage at the front. Since the rotors are all similar in construction, a description of one in detail will suffice. Each rotor as shown in Fig. 18 includes a propeller assembly having a pair of opposed round shafts 47 and 48. The hub 49 of a blade 50 is secured to one end of shaft 47 by means of screws 51, the end of the shaft being mounted in a socketed opening 52 in the hub. The hub has a flange 53 on its outer end. The hub 54 of a similar blade 55 is secured to one end of shaft 48 by means of screws 56, the end of the shaft being mounted in a socketed opening 57 in the hub. Hub 54 has a flange 58 on its outer end. The other end of shaft 47 is formed with a central socketed opening 59. An elongated cylindrical metal connector member 66 is fastened to the other end of shaft 48 and extends outwardly thereof into the socketed opening 59 of shaft 47 and is fastened thereto by a screw 61.

Figure 2:
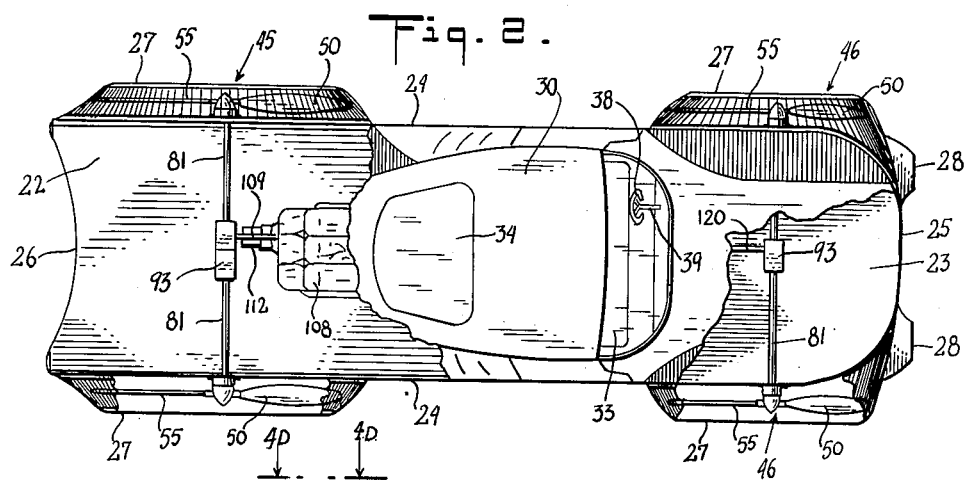
Fig. 2 is a top plan view thereof, with parts being shown broken away.

The connector member is formed with an annular head 62. The connector member extends through a metal ring 63 secured inside the socketed opening 59 by screws 64. Head 62 of the connector member is larger in diameter than the diameter of the opening in the ring 63 so that the blades are held in joined condition. Friction bearings 65 and 66 are interposed between the head of the connector member and the wall of the socketed opening and the inner ring 62 and other friction bearings 67 interposed between the adjacent ends of the shafts 47 and 48. Each blade 50 and 55 is laminated and of flat paddle shape. However the blades are so mounted and arranged and shaped that the plane of the body of one blade is disposed in a position perpendicular or at right angles to the plane of the body of the other blade as will be seen in Fig. 2 wherein the blades 50 are shown with the planes of the bodies thereof in a horizontal position or plane and the blades 55 are shown with the planes of the bodies thereof in a vertical position. Also blade 50 rotates axially in a direction different from blade 55.

Each propeller assembly extends across and is supported by a bearing member 69 having a hollow body with conical side wall 70 and a flat base 71. Inside the body and extending longitudinally thereof in spaced relation thereto is a tubular wall 72 formed integrally with a circular base 73 secured to the base 71. The conical wall 70 of the bearing 69 is formed with opposed openings 75 in line with opposed openings 76 in the inner wall 72. Shaft 47 of the propeller assembly is journalled in one of the openings 76 in the inner wall and the shaft 48 in the other opening 76, the shafts rotating on anti-friction bearings 77 in said openings. The hubs 49 and 54 of the blades extend through the openings 75 in the side wall 70 with their flanges 53 and 58 engaging the wall 72 to prevent longitudinal movement of the assembly. Base 73 of wall 72 is formed with a central opening 79 registering with a central opening 80 in the base 71 of the bearing.

Each rotor further includes a tubular shaft 81 formed integrally at one end with the base 71 of the bearing 69, the bore in said tubular shaft registering with the central openings 79 and 80 in the base 73 and base 71, respectively. The shaft 81 extends through a hollow bearing 82 having a curved wall 83 and a flat base 84 with a central opening 85 through which the shaft 81 extends. The other end of the bearing member is open and is fastened to the adjacent side wall 24 of the fuselage, around an opening 86 in the side wall by means of bolts 87 passing through an annular mounting flange 88 on the bearing and through the opening in the side wall. Shaft 81 extends into the interior of the fuselage and rotates on roller bearings 89 and 90 in the openings 85 and 86 in the bearing member 82 and side wall 24, respectively. The inner ends of the tubular shaft 81 extends through openings 91 in the end walls 92 of a rectangular-shaped spaced gear box 93 mounted on the fuselage at the front and rear thereof, at the center. The shaft rotates on roller bearings 94 in the openings 91. A bevel gear 95 is fastened to the inner end of each shaft 81 disposed perpendicularly to the axis thereof.

Each pair of propeller assemblies of rotors 45, 45 and 46, 46 is mounted for axial rotation of the blades thereof with the individual blades of each pair rotating in opposite directions. For this purpose, on the end of each of shafts 96 there is a bevel gear 98 in mesh with a bevel gear 99 on the shaft 47 and a similar bevel gear 100 on the shaft 48 of each propeller assembly, in the bearing members 69, the gear 98 rotating at right angles to the plane of the gears 99 and 100. When the assemblies are driven around bodily, the intermeshing of the stationary gear 98 and the movable gears 99 and 100 cause the shafts 47 and 48 with the blades 50 and 55 to rotate in opposite directions. The walls 72 of the bearing member 69 engage the shafts 47 and 48 outwardly of the gears 99 and 100 whereby the shafts are rigidly held against deflection.

Figure 15:
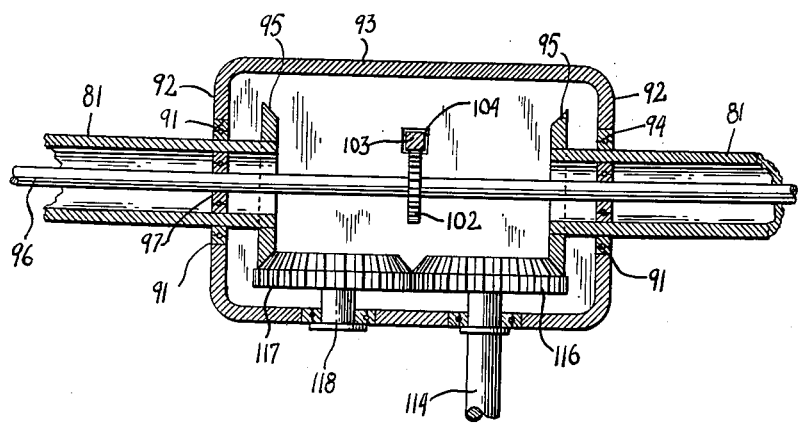
Fig. 15 is a vertical sectional detail view of the gear box at the rear of the airship, on an enlarged scale.

A pinion 102 (Fig. 15) is fastened on each shaft 96 inside the adjacent gear box 93 midway the ends thereof. A rack 103 extends across the center of each gear box 93 slightly spaced above the pinion 102 and extends loosely through the openings 104 in the side walls of the gear box. The teeth 105 of the rack are in mesh with the teeth of pinion 102 for rotating the shaft 96. Wires 106 (Fig. 11) have one end fastened to the ends of the rack 103 at the rear of the fuselage and pass over guide rollers 107 to the front of the fuselage. Wires are fastened at the other end of the rack 103 at the front of the fuselage. The wires pass through the pilot's compartment 31 where the controls for actuating the wires are located. Movement of the wires 106 in one direction will cause the racks 103 to turn the shafts 96 and propeller assemblies bodily in a clockwise direction, and movement of the wires in the other direction will cause the shafts and propellers to rotate bodily in a counterclockwise direction as viewed in Fig. 7.

An engine or motor 108 (Fig. 1) of any ordinary construction for turning the rotors is positioned and fastened to the fuselage behind the pilot's compartment and is suitably supported on the chassis of the fuselage or body. The drive from the engine or motor to the rear rotors 45, 45 is by means of a rotatable drive shaft 109 from the engine, passing through a differential housing 110 with suitable gears therein and extending through an opening 111 in the top end of a gear box 112 mounted on the fuselage chassis below the gear box 93 at the rear of the fuselage. Shaft 109 has a bevel gear 113 on its end inside box 93.

A driven shaft 114 (Fig. 11) extends between the bottome gear box 112 and the upper gear box 93 at the rear of the fuselage and extends through suitable openings in said boxes. A bevel gear 115 on shaft 114 in box 93 meshes with gear 113. Gears 113 and 115 rotate in planes at right angles to each other. A bevel gear 116 is fastened on the top end of the shaft 114 in the box 93 at the right hand side thereof, and gear 116 is in mesh with another bevel gear 117 on a parallel stub shaft 118 at the left hand end of the gear box as shown in Fig. 10. Gear 116 is in mesh with gear 95 on the end of the tubular shaft 81 of the rotor 45 at the right hand side of the fuselage as shown in Fig. 9, the gear 117 being in mesh with the gear 95 on the tubular shaft 81 of the rotor 45 at the left hand side of the fuselage as shown in Fig. 9. The gears 116 and 117 are in mesh with bevel gears 95 on the tubular shafts 81 for rotating the latter shafts 81 for bodily turning the rotors and propeller blades end over end as indicated by the arrows in Figs. 4A–4D.

In operation, the drive from the engine 108 is brought to the rear rotors 45, 45 by means of engine drive shaft 109, shaft 114, shafts 81 through gears 116, 117 and 95 whereby the bearing members 69 are turned carrying the blades 50 and 55 of the propeller assemblies bodily around end over end in a plane parallel to the plane of the side walls of the fuselage. Simultaneously, the drive is brought from shaft 114 to a shaft 120 having one end journalled in the rear wall of the box 112 and extending to the front of the fuselage below the shaft 109. Shaft 120 is connected to shaft 114 by intermeshing gears 121 and 122 on the shafts 114 and 120, respectively, the shaft 120 passing through a differential housing 123 on its way to the front of the fuselage. The gears 121 and 122 rotate in planes at right angles to each other. The front end of shaft 120 passes through an opening 124 in the front gear box 93 and carries a bevel gear 125 inside the box meshing with another bevel gear 126 mounted on a stub shaft in the rear wall of the box and being disposed in the same plane as the gear 125. Gear 125 is in mesh with gear 95 on the tubular shaft 81 of the rotor 46 at the right hand side of the fuselage, at the front, and gear 126 is in mesh with the gear 95 on the tubular shaft 81 of the rotor 46 at the left hand side of the fuselage at the front as shown in Fig. 10, whereby the bearing members 69 are turned carrying the blades 50 and 55 of the propeller assemblies of rotors 46 and 46 around bodily end over end in a plane parallel to the plane of the side walls of the fuselage. All of the rotors 45, 45, 46, 46 are thus synchronized and turn in unison in the same direction. The differential gears in the differential housing 123 permit the change of speed of the front pairs of propeller assemblies or rotors 46, 46 for stabilizing the airship.

Figure 3:
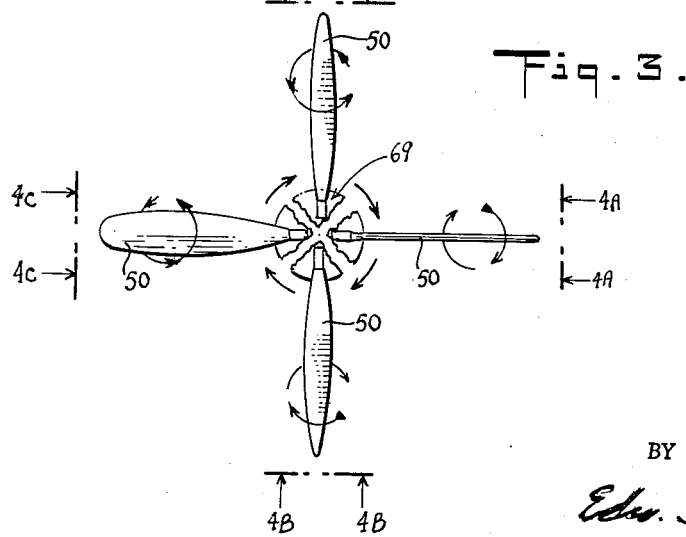
Fig. 3 is a diagrammatic view showing steps in the rotation of the propeller blades.
Figure 4A:
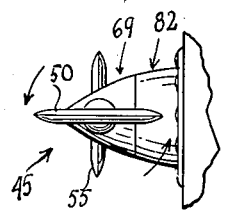
Figs. 4A, 4B, 4C and 4D are fragmentary partly plan and partly diagrammatic views showing steps in the rotation of the propeller blades.
Figure 4D:
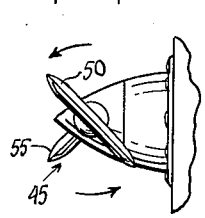
Figure 4C:
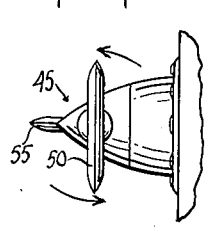
Figure 4B:
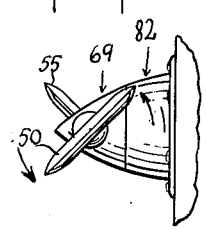

During the bodily end over end turning movement of the propeller assemblies, the blades 50 and 55 are turning axially in opposite directions and the pitch of the blades is changed due to the connection between the stationary gears 98 and the moving gears 99 and 100. Shaft 96 is normally nonrotatable so that its gear 98 is normally stationary so that gears 99 and 100 on shafts 47 and 48 are rotated in opposite directions. The gears 99 and 100 having twice as many teeth as the gear 98, for each complete bodily revolution of the propeller assembly of each rotor in end over end movement, the blades 50 and 55 of said assembly rotate axially 180 degrees. For example, if the blade 55 is horizontally disposed upon start of the movement, said blade 55 will move bodily downwardly and upon such downward movement will rotate axially in one direction 45 degrees thus changing the pitch of the blade 45 degrees; upon continued movement to horizontal position the blade will rotate axially another 45 degrees thus changing the pitch 90 degrees from its starting point; upon continued bodily movement upwardly to vertical position the blade will rotate axially another 45 degrees thus changing the pitch 135 degrees from its starting position, and upon continued bodily movement downwardly from vertical to horizontal starting position, the blade will turn axially another 45 degrees to its original starting position, thus turning 180 degrees axially at the same time, in the same manner, in the opposite direction and changes its pitch accordingly. During this axial rotation of the propeller or blade assembly, the rotor is turning 360 degrees. These pitch changes of the propeller assemblies are shown diagrammatically in Fig. 3.

Figure 5:
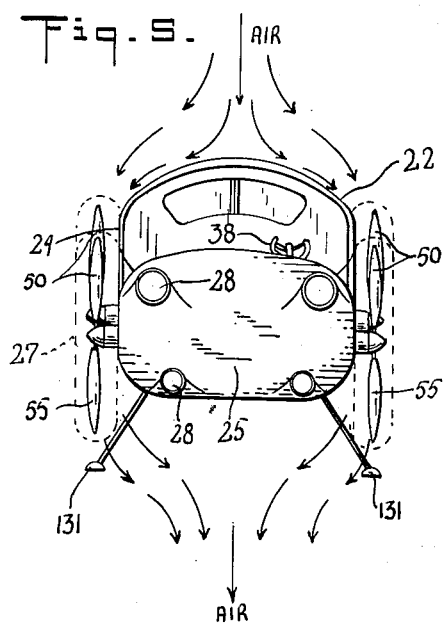
Fig. 5 is a front elevational view showing the direction of flow of the air produced by the propellers, the covers for the propellers being shown in dotted lines.
Figure 6:
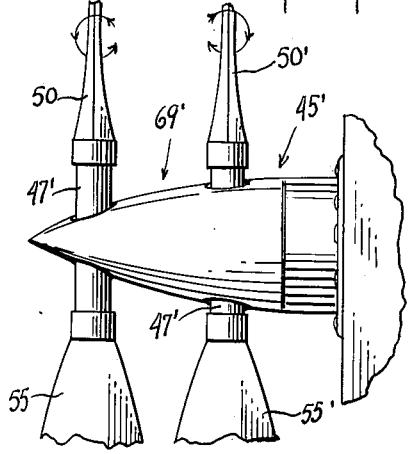
Fig. 6 is a fragmentary top plan view of a modification of the invention.

Upon end over end rotation of the blade assemblies the blades 50 and 55 when at their topmost position suck the air from the top of the airship thereby creating a vacuum at the top of the airship as shown by arrows in Fig. 5 and diagrammatically in Fig. 18. Continued rotation of the blades forces the air down the sides of the airship and under the airship where it is compressed as shown by the arrows in Fig. 5 and diagrammatically in Fig. 19, the air compression giving the airship lifting power whereby the airship rises.

Figure 7:
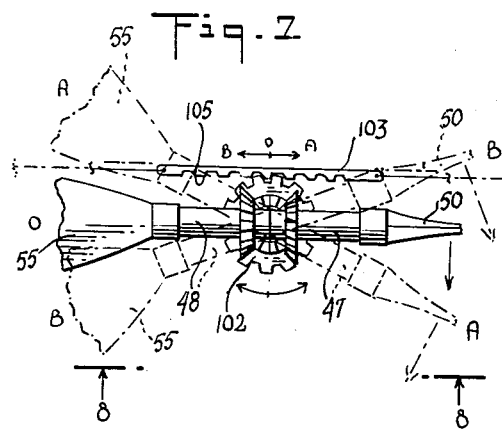
Fig. 7 is a part side elevational and part diagrammatic view showing the normal position of the propellers in solid lines and the moved positions for forward and rearward movements in dotted lines.
Figure 13:
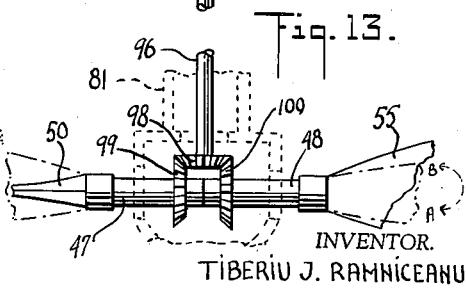
Fig. 13 is a top plan view of the parts shown in Fig. 7, parts being omitted and parts being shown in dotted lines and parts being broken away.
Figure 14:
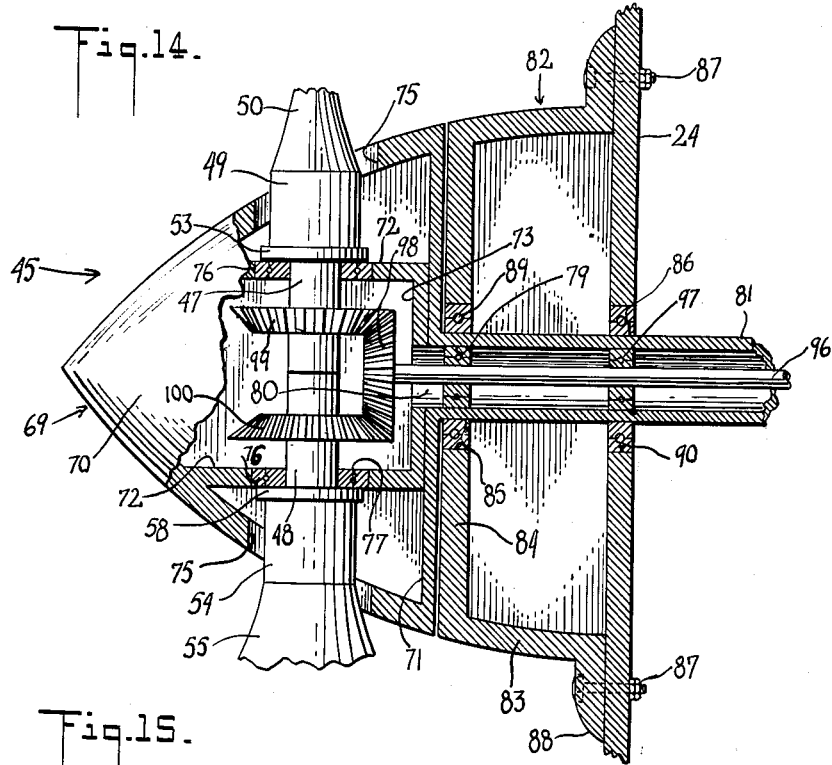
Fig. 14 is a sectional view of the propeller mounting shown in Fig. 1, parts being shown broken away, on an enlarged scale.

Referring particularly to Fig. 7, in order to propel the airship forwardly or rearwardly the propeller assemblies including the shafts 47 and 48 and blades 50 and 55 are tilted 45 degrees endwise with respect to the horizontal or with respect to the longitudinal axis of the fuselage. If it is desired to propel the airship forwardly, the propeller assemblies are tilted 45 degrees endwise so that the blades 50 with their bodies in a horizontal plane are in a down position and the other blades 55 with their bodies in a vertical plane are upwardly inclined, such tilted position of the blades being shown in Fig. 7 as the A—A position. This A—A position of the blades forces the air downwardly along the sides of the airship and then rearwardly as shown by the arrows in Fig. 5, thus propelling the airship forwardly.

In order to propel the airship rearwardly, the propeller or blade assemblies are tilted in the opposite direction, that is, the blades 50 with their bodies in a horizontal position are tilted upwardly and the other blades 55 are slanted downwardly. This rearward driving position is shown in Fig. 7 as the B—B position. When the blades are thus positioned, the air is forced by the blades downwardly and forwardly thereby driving the airship rearwardly.

The tilting operation of the propeller or blade assemblies is accomplished by means of the racks 103 and pinions 102. When the wires 106 are actuated by the hand wheel 38 in the pilot's compartment and pulled in one direction, the racks are moved in the direction A of Figs. 7 and 8 and the propeller or blade assemblies are tilted to the position A—A of Fig. 7 for forward propulsion of the airship. When the wires are moved in the opposite direction, the racks will be moved in the direction B of Figs. 7 and 8 and the propeller or blade assemblies are tilted to the position B—B of Fig. 7 for rearward propulsion of the airship.

The airship is provided with a steering rudder 130 at its rear for controlling the lateral direction of flight, and is provided at its front and rear with collapsible landing gear 131, the movements of which rudder and landing gear being controlled in the ordinary manner.

It will be noted that the propeller blades 50 and 55 do not protrude from the fuselage and are protected by the flanges 27 so that there is little likelihood of injury or damage to person or property by the blades.

It will also be noted that the angular position of the propeller assemblies may be readily changed without changing the position of the fuselage or body of the airship and that the pitch of the blades may be readily accomplished. Stabilized movement of the airship accordingly is provided.

Figure 8:
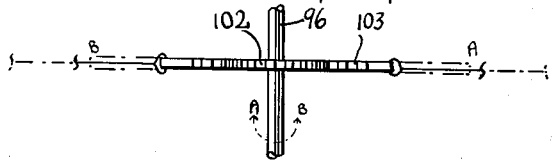
Fig. 8 is a bottom plan view of the rack and pinion of Fig. 7 looking along the line 8—8 of Fig. 7.

In Fig. 8, a modified rotor construction is shown. In this form, the bearings 69' of the motor 45' supports a pair of spaced propeller or blade assemblies including shafts 47' and blades 50' and 55'. The blades of one propeller assembly are mounted to rotate in a direction opposite to the direction of rotation of the other blades of the other assembly as shown by the arrows. Greater power and maneuverability are provided by this modified arrangement of propeller assemblies.

While I have illustrated and described the preferred embodiments of my invention, it will be understood that changes in details of construction might be made without departing from the principle of the invention and I desire to be limited only by the state of the prior art and the appended claims.

I claim:

1. An airship of the kind described comprising a fuselage rectangular in shape in plan including side walls, pairs of rotors supported on the fuselage, one pair being disposed at the rear of the fuselage and the other at the front of the fuselage, each rotor including a propeller assembly, each propeller assembly including a hollow rotatable bearing member having a conical side wall with opposed openings therein, a pair of opposed aligned shafts extending across the interior of each bearing member, blades fixed on the outer ends of said shafts and protruding through the openings in the conical wall of the bearing member and outwardly thereof, aligned tubular shafts having one end integrally formed with the bearing members, an engine mounted on the fuselage, a drive shaft having one end connected to said engine, gearing interposed between the other end of said drive shaft and the ends of the tubular shafts of the rear rotors for rotating said rear rotors end over end, a driven shaft in vertical alignment with said drive shaft and extending forwardly to the front of the fuselage, gearing interposed between said other end of said drive shaft and the rear end of said driven shaft for rotating the driven shaft, gearing interposed between the forward end of said driven shaft and the tubular shafts of the front pair of rotors for rotating said front rotors, means for axially rotating said blades in opposite directions, said last-mentioned means including a pilot controlled shaft extending coaxially within said tubular shafts to a point adjacent said opposed aligned shafts, gearing means interposed between said pilot control shaft and said opposed aligned shafts mounting the blades, said hollow rotatable bearing member of each propeller assembly enclosing the last mentioned gearing means, said bearing member having walls engaging the aligned shafts mounting the blades at points outwardly of the last-named gearing.

2. An airship as defined in claim 1 wherein the last named gearing for axially rotating the blades includes a bevel gear on each of the opposed aligned shafts mounting the blades adjacent the inner ends of the shafts forming closely spaced pairs of gears, a control gear mounted as the outer extremity of said pilot control shaft and disposed at right angles to the gears mounted on the opposed aligned shafts and in mesh with said gears whereby upon bodily rotation of the propeller assemblies the gears of the pairs of gears are given a rotary motion, the ratio of the teeth on the rotatable bevel gears relative to the teeth on the said control gear being 2 to 1.

3. An airship as defined in claim 1 wherein the last named gearing for axially rotating the blades includes bevel gears on the shafts mounting the blades, a control gear mounted at the outer extremity of said pilot control shaft and disposed at right angles to the gears mounted on the opposed aligned shafts, the ratio of the teeth on the rotatable bevel gears relative to the teeth on said control gear being 2 to 1 whereby for each complete bodily revolution of the propeller assembly of each rotor in end-over-end movement, the blades of said assembly rotate uniformly and axially 180 degrees.

References Cited in the file of this patent
UNITED STATES PATENTS

| | | |
|---|---|---|
| 944,301 | Warshavasky | Dec. 28, 1909 |
| 992,874 | Jatunn | May 23, 1911 |
| 1,005,812 | Crockett | Oct. 17, 1911 |
| 1,024,700 | Rikhoff | Apr. 30, 1912 |
| 1,040,695 | Koiw | Oct. 8, 1912 |
| 1,957,739 | Szafranski | May 8, 1934 |
| 1,990,462 | Netter | Feb. 5, 1935 |
| 2,019,909 | Johanson | Nov. 5, 1935 |